(12) United States Patent
Leleve et al.

(10) Patent No.: US 6,341,884 B1
(45) Date of Patent: Jan. 29, 2002

(54) VEHICLE HEADLIGHT, CAPABLE OF EMITTING DIFFERENT TYPES OF BEAMS

(75) Inventors: Joël Leleve, Epinay sur Seine; André Prevost, Mennecy; Antoine De Lamberterie, Paris, all of (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 09/297,567
(22) PCT Filed: Aug. 31, 1998
(86) PCT No.: PCT/FR98/01870
§ 371 Date: May 3, 1999
§ 102(e) Date: May 3, 1999
(87) PCT Pub. No.: WO99/11969
PCT Pub. Date: Mar. 11, 1999

(30) Foreign Application Priority Data

Sep. 3, 1997 (FR) ............................................. 97 10949
Mar. 19, 1998 (FR) ............................................. 98 03517

(51) Int. Cl.$^7$ ................................................. F21V 7/00
(52) U.S. Cl. .......................... 362/514; 362/40; 362/282; 362/324
(58) Field of Search .......................... 362/40, 514, 282, 362/322, 324, 336, 337, 338, 339

(56) References Cited

U.S. PATENT DOCUMENTS

| 4,827,388 A | 5/1989 | Miyazawa .................. 362/284 |
| 5,754,100 A | * 5/1998 | Park .......................... 362/40 X |
| 6,059,435 A | * 5/2000 | Hamm et al. ................ 362/514 |

FOREIGN PATENT DOCUMENTS

| DE | 43 38 603 | 6/1994 |
| FR | 1 536 280 | 8/1968 |
| FR | 1 598 459 | 8/1970 |
| FR | 2 214 860 | 8/1974 |
| FR | 2 577 014 | 8/1986 |
| GB | 2 150 275 | 6/1985 |
| GB | 2 170 587 | 8/1986 |

OTHER PUBLICATIONS

French Search Report dated May 22, 1999.
French Search Report dated Dec. 2, 1998.
International Search Report dated Nov. 19, 1998.

* cited by examiner

Primary Examiner—Sandra O'Shea
Assistant Examiner—John Anthony Ward
(74) Attorney, Agent, or Firm—Morgan & Finnegan, LLP (57) ABSTRACT

A motor vehicle headlight comprises a light source mounted in a reflector and a glass. The reflector is mounted to pivot about a generally vertical axis, and displacement means are provided to vary the angular position of the reflector. According to the invention, the reflector is capable of occupying at least one first angular position in which the beam emitted thereby passes through a first glass to generate a first type of beam, and a second angular position which is fixed and different form the first angular position(s), and in which the beam passes through a second glass; the headlight also has optical means for generating through said second glass a fixed beam which has photometric characteristics different from those of the beam passing through the first glass. Application in particular to two-function headlights for providing both a cornering light beam and a fog light beam.

34 Claims, 7 Drawing Sheets

VEHICLE HEADLIGHT, CAPABLE OF EMITTING DIFFERENT TYPES OF BEAMS

FIELD OF THE INVENTION

The present invention relates in general to motor vehicle headlights, and more particularly to an accessory headlight capable of selectively generating two distinct types of beam, e.g. both a moving or "cornering" beam for lighting the road while taking account of corners taken by the vehicle, and also a different beam, e.g. of the fog light type.

BACKGROUND OF THE INVENTION

Accessory headlights for fitting to most up-market or middle-market vehicles already include headlights that generate a cornering beam; conventionally they comprise both a reflector co-operating with a light source such as a filament lamp to generate a "cornering" beam, the reflector being mounted to pivot about a generally vertical axis, and displacement means that are provided to servo-control the angular position of the reflector, e.g. as a function of the position of the vehicle steering wheel.

Headlight units are also known that combine within a single housing both a cornering headlight and a fog headlight.

Thus, document FR-A-2 626 625 describes a headlight unit comprising a single light source which co-operates both with a fixed first reflector of large size for forming a fog light beam, and with a second reflector rotatably mounted within the first reflector for generating a cornering type beam.

Also known, from document FR-A-2 577 014, is a headlight unit similar to the above in which the glass is designed to deflect differently rays coming from the moving reflector and rays coming from the fixed reflector.

Those two known headlights serve to modify a conventional fog light beam so as to direct a portion of the light to one side of the road or the other as a function of the cornering of the vehicle. It is in that respect that they merely constitute adaptive fog headlights.

However, such known headlights do not in any way make it possible selectively to obtain either a fixed fog light beam in compliance with regulations, or else a genuine cornering beam, e.g. usable together with a conventional dipped beam.

In addition, a genuine cornering beam, of the kind now widely accepted in the motor industry, must present a lateral spread of about ±20°, defined on top by a horizontal cutoff, and presenting on its axis maximum illumination of at least 20 lux to 25 lux at a distance of 25 meters ahead of the vehicle. Neither of the two above-mentioned documents enables such an object to be achieved, with variations in the light necessarily being "drowned" in the conventional fog light beam.

In this respect, it will be observed that the above-defined cornering beam differs from a conventional fog light beam by substantially smaller spread and by range, as defined by a central concentration spot, which is much longer.

SUMMARY OF THE INVENTION

The present invention seeks to improve prior art cornering headlights, and in particular to take advantage of the characteristics of a cornering headlight to make another type of beam available on request and separately, by using means that are simple, low cost, and easy to implement industrially, for example a fixed fog light beam complying with photometric regulations. In addition, the present invention seeks to provide a headlight in which the number of components implemented remains limited, with the advantages of being compact, very simple to assemble, and reasonable in cost.

To this end, the invention provides a motor vehicle light comprising a light source mounted in a reflector and a glass, the reflector being mounted to pivot about a generally vertical axis, and displacement means being provided to vary the angular position of the reflector, the headlight being characterized in that the reflector is capable of occupying at least one first angular position in which the beam emitted thereby passes through a first glass to generate a first type of beam, and a second angular position which is fixed and different from the first angular position(s), and in which the beam passes through a second glass, and in that the headlight also comprises optical means for generating through said second glass a fixed beam which has photometric characteristics different from those of the beam generated through the first glass.

Preferred but non-limiting features of the headlight of the invention are as follows:

the first and second glasses extend one from the other;

the first and second glasses are made as a single piece;

the first glass extends ahead of the second glass which then constitutes an intermediate screen between the reflector and the first glass;

said angular positions and the positions of the two glasses are selected so that each of the first and second glasses respectively receives solely the beam emitted by the reflector in the first angular position(s) and solely the beam emitted by the reflector in the second angular position;

the first glass is essentially smooth and its surface is oriented in such a manner as to attenuate reflection losses thereon;

the beam generated by the sole reflector is a laterally-spread cutoff beam;

the fixed beam is a beam of the fog light type;

said first angular position of the reflector is a single position;

said displacement means are suitable for varying said first angular position of the reflector over a given range of angles as a function of the position of the vehicle steering wheel;

the optical means are suitable for spreading horizontally the light beam emitted by the reflector;

said second angular position is oblique relative to the axis of the vehicle and is situated on the opposite side of said axis to said first angular position, and said second glass directly receives the beam emitted by the reflector in the second angular position;

the optical means are provided on said second glass;

the second glass has rectifying means for rectifying the beam from the reflector when in said second angular position and for obtaining a beam of mean direction that is substantially parallel to the axis of the vehicle;

the optical means for spreading and the rectifying means are constituted by the same optical arrangements;

said second angular position is essentially transverse relative to the axis of the vehicle and is situated on the opposite side of said axis to said first angular position, and said second glass receives the beam emitted by the reflector when in the second angular position via a deflector mirror; and the optical means are provided either on said second glass or on the deflector mirror.

Other features, objects, and advantages of the present invention will appear more clearly on reading the following detailed description of a preferred embodiment thereof, given by way of example and with reference to the accompanying drawings, in which:

DETAILED DESCRIPTION OF THE DRAWINGS

Figure 1:
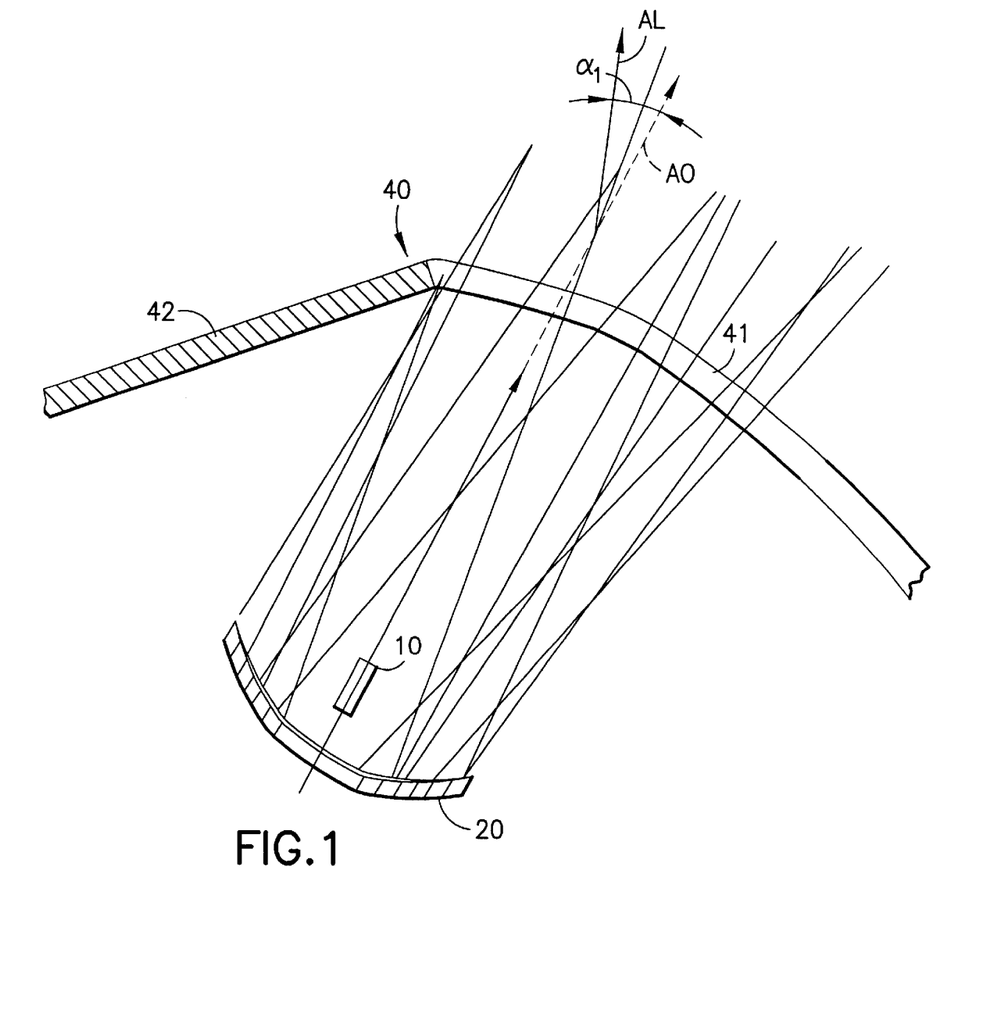
FIG. 1 is a diagrammatic horizontal section view through an embodiment of a two-function headlight of the invention, operating in a first mode.
Figure 2:
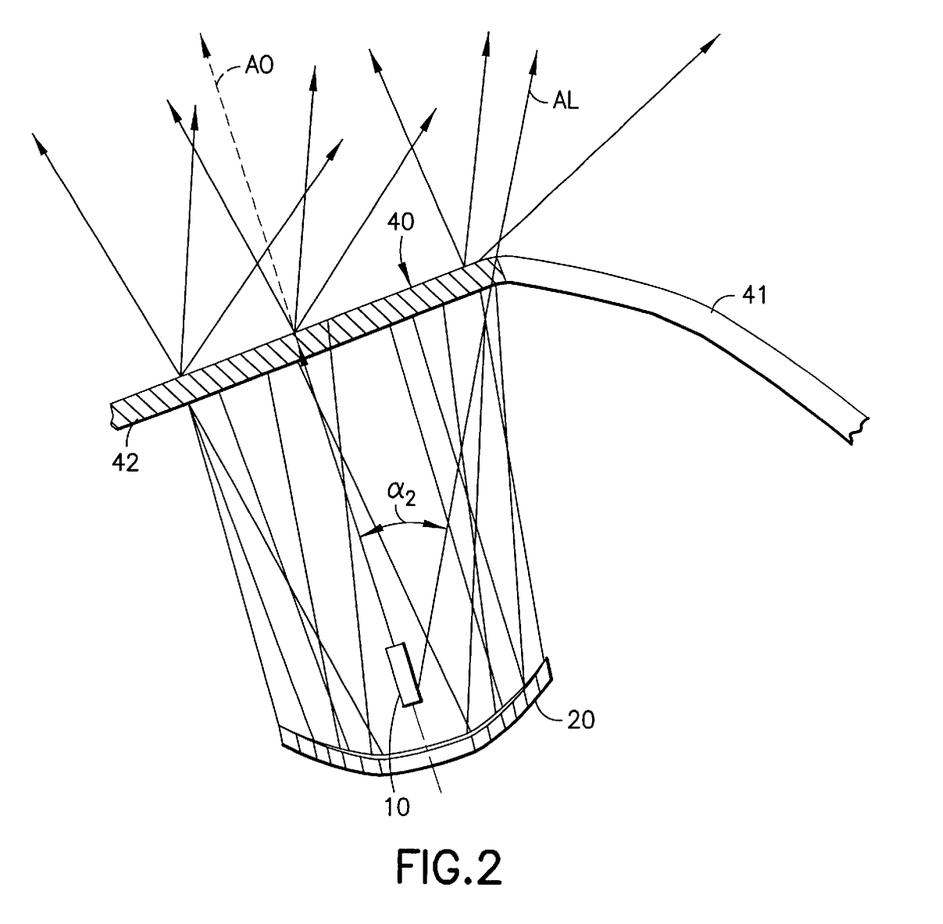
FIG. 2 is a view analogous to FIG. 1, showing a second operating mode of the headlight.

With reference initially to FIGS. 1 and 2, there is shown a cornering/fog headlight which comprises a light source such as a halogen lamp having an axial filament 10, a beam-forming reflector 20, and a glass 40 having a first portion 41 and a second portion 42. The assembly is received in an appropriate headlight housing, not shown.

The reflector 20 is suitable, on its own, for generating a cornering beam having the characteristics mentioned in the introduction. To make it, the person skilled in the art can take inspiration, for example, from documents FR-A-2 536 503, FR-A-2 602 305, FR-A-2 609 148, FR-A-2 639 888, and FR-A-2 664 677, all in the name of the Applicants. Preferably, a reflector 20 is used which is based on a plurality of individual reflecting surfaces each capable of generating images of the filament which are all situated beneath a cutoff, and which are preferably essentially in alignment beneath and flush with said cutoff, while simultaneously each of them ensures that the images are uniformly spread and controlled beneath said cutoff.

More precisely, one of the zones of the reflector (preferably its middle zone) is initially defined in application of the principles of the above-specified documents by adjusting its parameters and mainly the shape of its horizontal generator line and the top and bottom defocusing of vertical sections of the reflecting surface as a function of the size of the reflector and of the photometric characteristics desired for the broad portion of the beam.

Thereafter, the adjacent zones to left and to right of the middle zone are defined with their own parameters (in this case likewise mainly the shape of their horizontal generator lines and the top and bottom defocusing of the vertical section), firstly as a function of the desired positioning for the light projected from these zones, and secondly and above all so that the reflecting surfaces of these adjacent zones meet the reflecting surface of the middle zone via respective transition lines which extend downwards between the top and bottom edges of the reflector and which give rise along said lines to lateral deviation by each of the adjacent reflecting surfaces that is not constant but which, on the contrary, varies regularly along said line.

The design of the reflector is continued by defining, in the same manner as before, a third zone adjacent to the second, etc.

These steps can be repeated for as many zones as are necessary, in the left and right portions of the reflector.

This provides a reflector for a cornering headlight in which the various laterally juxtaposed zones can be parameterized so as to generate different beam portions with a high degree of flexibility, so as to facilitate modeling of the final beam while nevertheless obtaining a reflecting surface without any zero order discontinuity, which in well-known manner would give rise to optical anomalies, and obtaining a surface whose appearance, when the light is out, is that of a reflector having broad warped stripes, which is advantageous from the esthetic point of view.

Since all of the beam modeling is performed by the reflector, the portion of the glass which is associated with the cornering function can be entirely smooth, as described below, or may have stylistic elements only that are optically inactive. There is therefore no difficulty in allowing the glass to remain fixed, in contrast to certain prior art cornering lamps in which the glass moves.

In addition, it is preferable to use a reflector 20 having a base focal length that is short, so as to optimize, within given outlines, the quantity of light that is recovered; its depth, its width, and its height are preferably of the order of 20 mm×60 mm×30 mm, thus making it possible with a reflector designed in the manner described above to achieve a minimum of 20 lux on the axis (when using a standard "H1" type filament lamp or the like), while presenting the appropriate width.

In likewise preferred manner, the reflector of the present example has five zones designed as described above, namely:

a middle zone;

two intermediate zones; and two edge zones.

A hole is formed through the middle zone for the lamp which can be a standardized single-filament lamp of the "H1", "H2", "H3", "H7", or similar type.

The five zones can have the following characteristics:

middle zone Z1: it has a horizontal generator line suitable for achieving a large amount of horizontal spread, about −20° to +20°, so as to give the beam the desired width with large images of the filament 10; its width in the axial horizontal plane preferably lies in the range about 15 mm to 18 mm;

left and right intermediate zones: they are preferably symmetrical about the axial vertical plane and suitable for providing an intermediate amount of spread advantageously extending from about −12° to +12°, so as to increase the quantity of light on either side of the road axis; their width in the axial horizontal plane preferably lies in the range about 7 mm to 9 mm, each; and edge zones: they are preferably symmetrical about the axial vertical plane and suitable for providing smaller spreading, varying progressively from ±7° at the transition with the adjacent intermediate zone to 0° at the lateral edge of the reflector; as a result, smaller filament images are used to concentrate light on the axis making it possible to reach a value of about 20 lux; the width of these zones in the axial horizontal plane preferably lies in the range about 12 mm to 15 mm, each.

Thus, in this embodiment, lateral spreading as provided by the various zones becomes narrower with increasing distance of the zone laterally from the optical axis.

It will also be observed that by selecting appropriate defocusing for the various zones, each of the portions of the beam has unfocused lateral edges for the reasons explained above, thereby firstly ensuring that the various portions of the beam are uniformly mixed together in the overall beam, and secondly making it possible to obtain an overall beam whose lateral edges are unfocused, with lighting of previously dark zones taking place progressively which is highly advantageous for a cornering light. In this respect, it will be observed that the angular ranges given above are mean values, with the spreading that is provided in fact varying progressively around those mean values.

In the example shown in FIGS. 1 and 2, the headlight is designed to be mounted on the front of the vehicle on the right-hand side. In a first mode of operation, the reflector 20 can occupy a variable angular position $\alpha 1$ towards the right, this angle being measured between a direction marked AL parallel to the longitudinal axis of the vehicle, and the optical axis AO of the reflector 20. By way of example, the angle $\alpha 1$ may vary over the range 10° to 40°, being at 40° when the steering wheel of the vehicle is at its rightmost position, and 10° when the steering wheel of the vehicle is in the straight-ahead position or is turned to the left, with intermediate angles being taken as a function of the extent to which the vehicle is turning right.

In a particular case, provision can be made in this operating mode for the angle $\alpha 1$ to be remained fixed, e.g. equal to 10°, whatever the position of the steering wheel.

In this first mode of operation, the light beam passes through a first portion 41 of the glass, which as mentioned above can be smooth.

The headlight is designed to adopt a second operating mode in which the axis AO of the reflector 20 now forms a fixed angle $\alpha 2$ to the left of the axis AL, e.g. an angle of 20°.

In this position, the light beam coming from the reflector passes through a second portion 42 of the glass which is distinct from the first.

To be able to move between the angular position or range $\alpha 1$ and the angular position $\alpha 2$, the reflector 20 is mounted to pivot about a vertical axis that preferably passes close to the filament 10.

The means for moving the reflector can be entirely conventional, and they are therefore not described in greater detail.

Symmetrically, a headlight of the invention mounted on the left-hand side of the front of the vehicle will have a reflector 20 suitable, in its first mode of operation, for occupying an angular range or position $\alpha 1$ to the left, and in its second mode of operation, a fixed angular position $\alpha 2$ at 20° to the right.

In the first mode of operation, as shown in FIG. 1, the beam from the reflector 20 passes through the portion 41 of the glass 40, which portion is essentially smooth and of geometry that makes it possible to attenuate reflector losses thereat. The beam transmitted to the outside of the headlight is of the cornering type.

In the second mode of operation, as shown in FIG. 2, and as used for selectively generating a beam that is different from the beam generated by the reflector on its own, for example a fog light beam, the reflector 20 is pointed by said displacement means to take up the angular position $\alpha 2$ so that it passes through the portion 42 of the glass.

Since the beam from the reflector on its own has the characteristics of a cornering beam, it presents a relatively well-marked concentration spot. The portion 42 of the glass therefore possesses optical arrangements, as described below with reference to FIGS. 3 and 4, firstly for increasing the horizontal spread of the beam, secondly for diluting its concentration spot, and thirdly for rectifying the beam overall so as to form a fog light beam having the looked-for photometric characteristics, being emitted in a mean direction that is substantially parallel to the axis AL.

Figure 3:
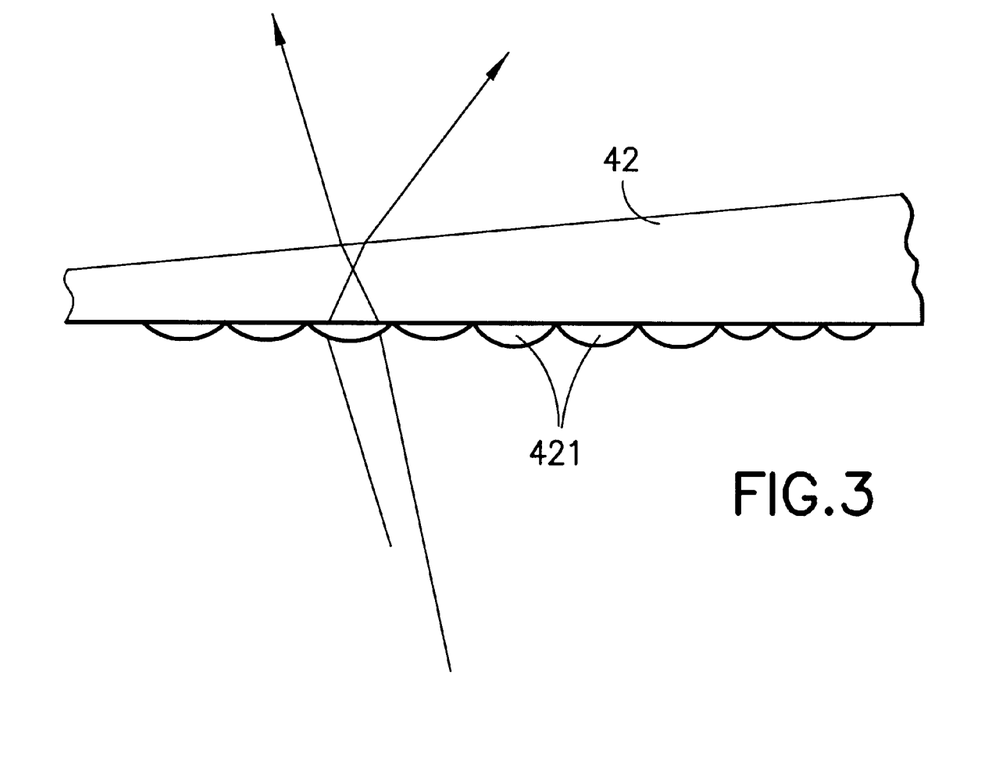
FIG. 3 is a diagrammatic horizontal section view of a first embodiment of the second glass of the headlight, provided with its optical means.

FIG. 3 shows a first embodiment of the portion 42 of the glass 40 in which the outside face of said portion 42 forms together with the mean plane of its inside face a prism for deflecting incident rays to the right through an angle of 20°, for example, while its inside face is provided with vertical stripes 421 for diluting the incident beam and spreading it horizontally.

Figure 4:
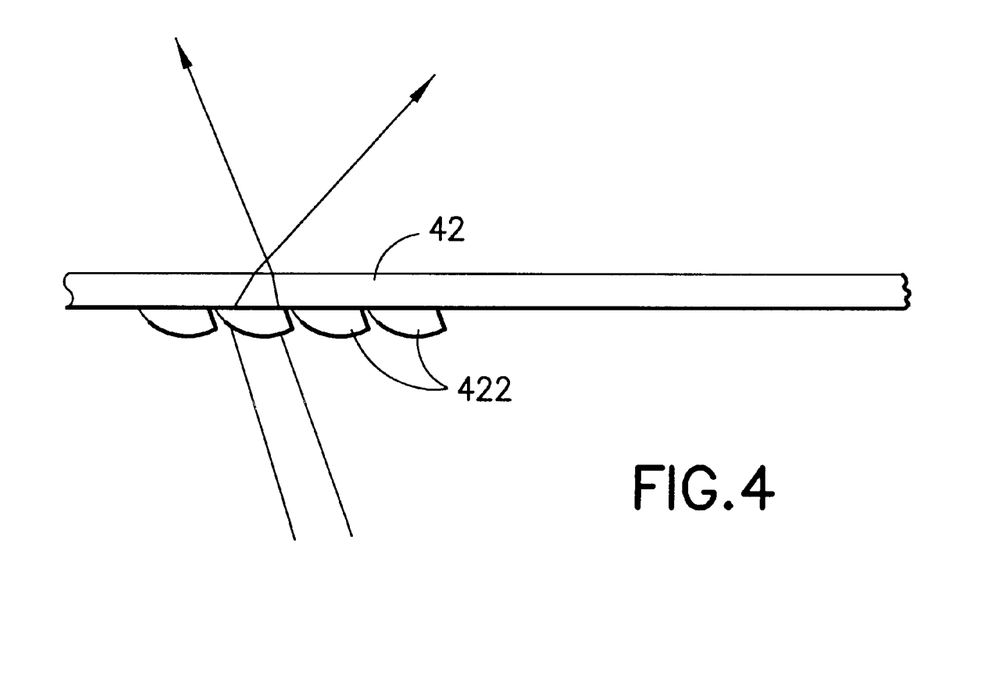
FIG. 4 is a diagrammatic horizontal section view of a second embodiment of the second glass of the headlight, provided with its optical means.

FIG. 4 shows a second embodiment of the portion 42 of the glass 40 in which the distance between the outside face of the glass 40 and the mean plane of its inside face is constant, with the prismatic effect then being provided by vertical prismatic stripes 422 which also serve to dilute the incident beam and to spread it horizontally.

Figure 5:
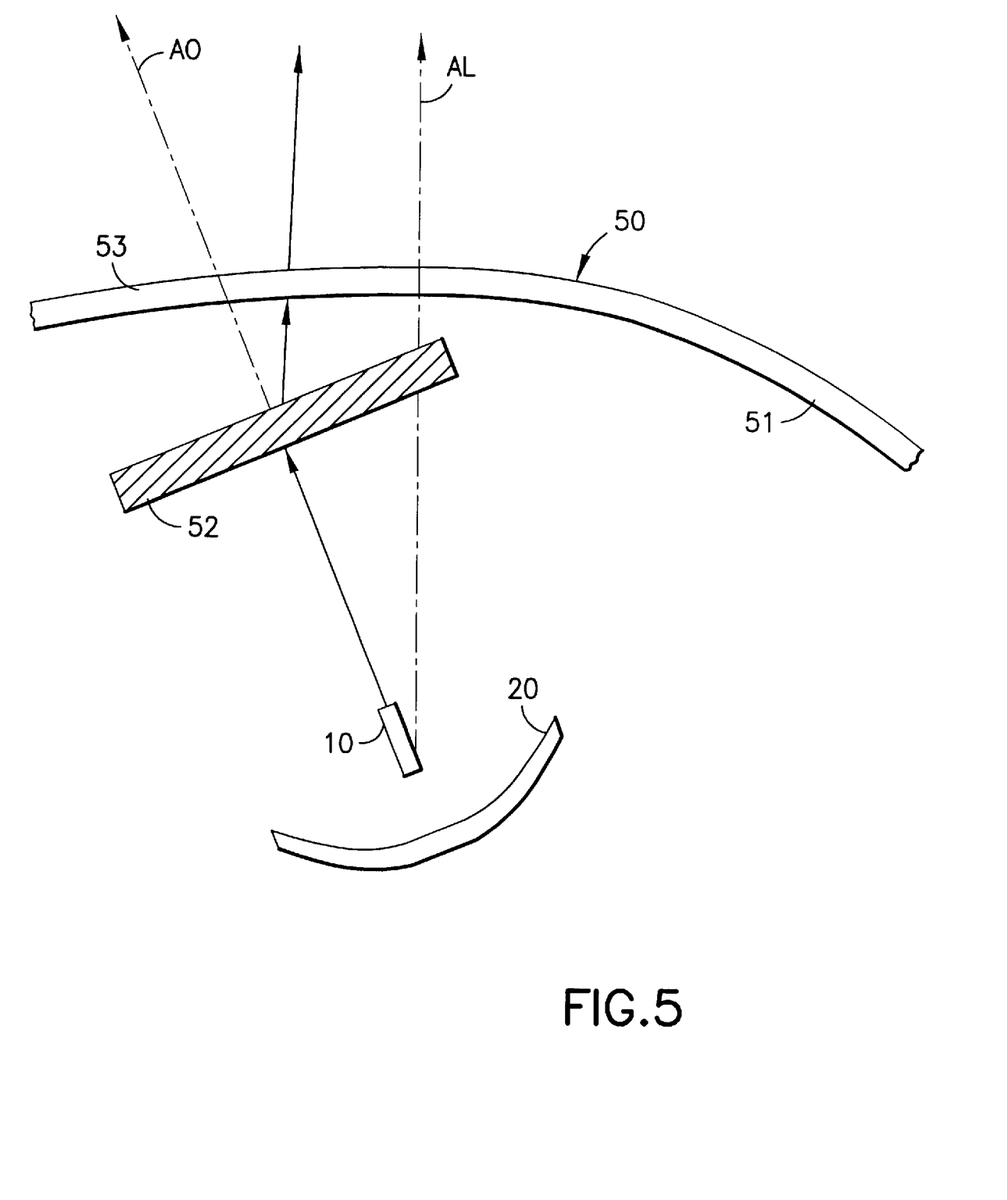
FIG. 5 is a diagrammatic horizontal section view of a second embodiment of a two-function headlight of the invention.

FIG. 5 shows a second embodiment of the invention in which the function of glass 42 in FIG. 1 is implemented in the form of an intermediate screen 52, the smooth potion 51 of the glass 50 being extended as a smooth portion 53 in front of the intermediate screen.

As mentioned above, in the first mode of operation of the headlight, the angular position of the reflector 20 can be servo-controlled to the position of the vehicle steering wheel so as to accompany the path of the vehicle when cornering. The portion 51 of the glass is naturally designed so as to cover the full extent of this angular range.

Figure 6:
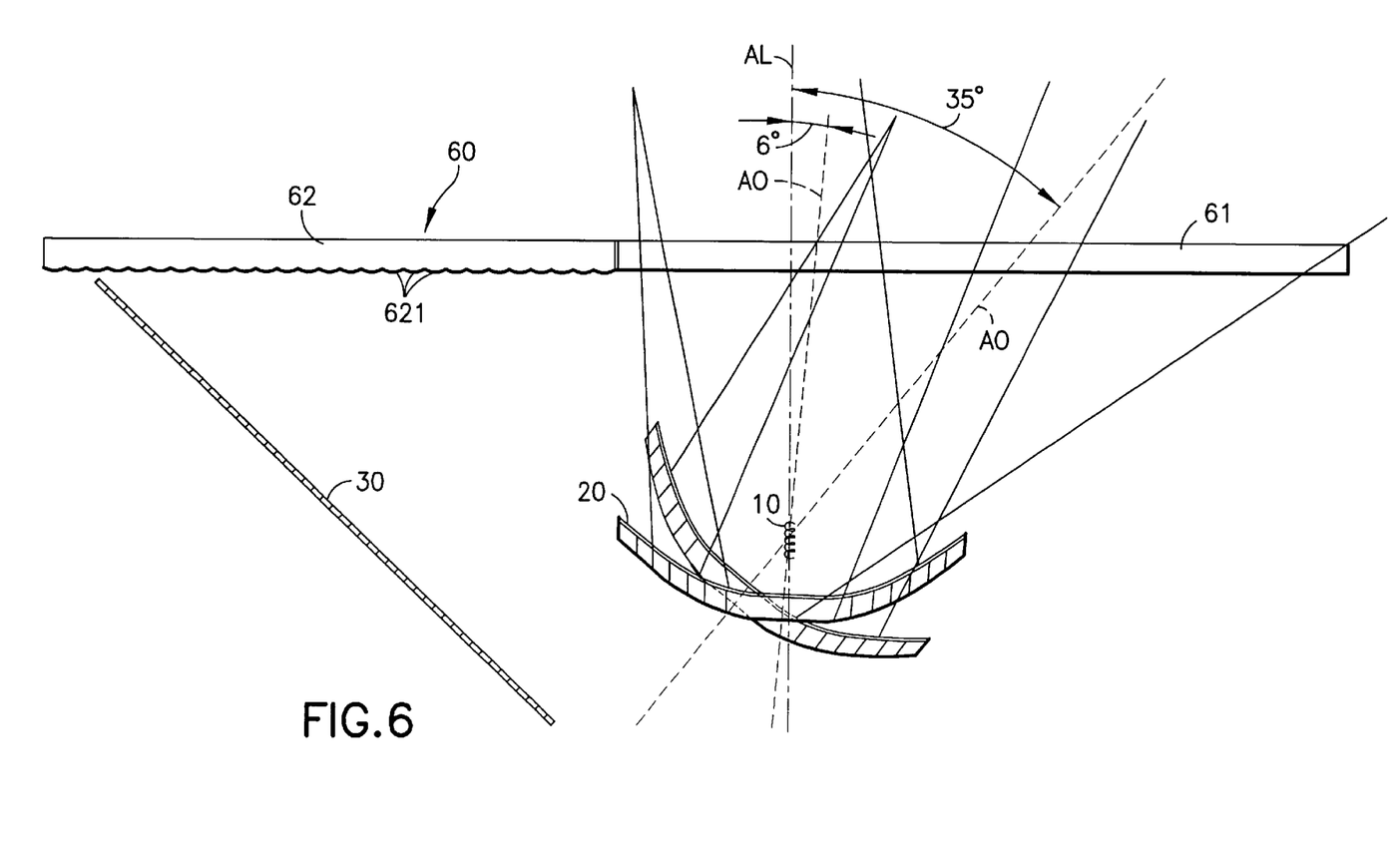
FIG. 6 is a diagrammatic horizontal section view of a third embodiment of a two-function headlight of the invention, in a first mode of operation.
Figure 7:
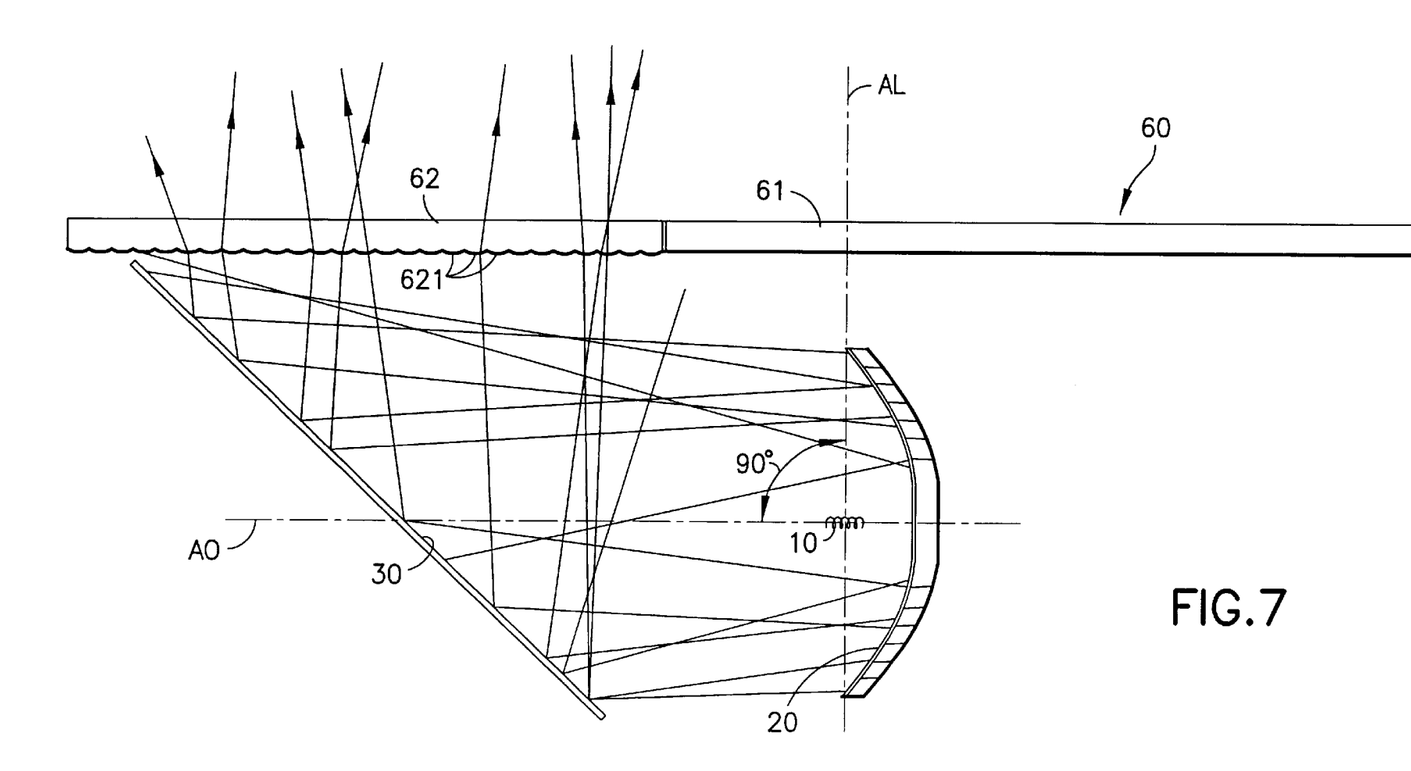
FIG. 7 is a view analogous to FIG. 1 showing the second mode of operation of the FIG. 6 headlight.

With reference now to FIGS. 6 and 7, there is shown a cornering/fog headlight constituting a third embodiment of the invention which is characterized by the presence of an additional deflecting mirror 30.

In the same manner as before, the reflector 20 is suitable for generating a "cornering" beam and is mounted to pivot about a vertical axis that preferably passes close to the filament 10. Its angular position is likewise servo-controlled to the angular position of the vehicle steering wheel so as to accompany the path of the vehicle when cornering.

In the present example, the headlight is designed to be mounted on the front of the vehicle on its right-hand side, and the reflector 20 in the first mode of operation (cornering mode) can adopt any angular position $\alpha 1$ lying, for example, in the range 6° to 35° to the right. Its rotation is varied between these values while the vehicle is turning right, and in the present example its position remains at 6° to the right when the vehicle is traveling straight ahead or is turning to the left.

The deflector mirror 30 is specifically a fixed plane mirror, e.g. inclined at 45° relative to the longitudinal axis AL of the vehicle.

Finally, the glass 60 is designed to extend both in front of the reflector 20 and in front of the mirror 30.

It thus has a first portion 61 which is preferably generally smooth or provided solely with elements of decoration that are optically inactive, which portion is situated so as to pass the beam emitted by the reflector 20 while it lies in the above-described range of 6° to 35°, and a second portion 62 having preferably-vertical stripes 621 situated on its inside face, said second portion being situated in front of the deflector mirror 30.

The portions of 61 and 62 of the glass are preferably made as a single piece.

The headlight can adopt a first mode of operation (FIG. 6) corresponding to a cornering function. As described above, the reflector 20 adopts a position lying between the two extreme angular positions shown in the figure, and the portion 61 of the glass is dimensioned and positioned in such a manner as to pass the beam over the entire angular range covered by the reflector 20.

The second mode of operation is shown in FIG. 7. In this case, the reflector 20 is turned towards the deflector mirror 30 which in turn deflects the cornering beam generated by said reflector 20 without altering it towards the portion 62 of the glass. For example, the reflector 20 can be turned to an angle of about 90° relative to the direction AL, with the reflector 20 then being held fixed in this position.

The stripes 621 in this portion serve, as before, firstly to increase the horizontal spread of the beam, e.g. to values of the order of ±40°, and secondly to dilute within this enlarged beam the concentration spot that exists in the original cornering beam.

As a result, an outlet beam is obtained from the portion 62 of the glass which is entirely suitable for constituting a fog light beam.

The lateral distance between the reflector 20 and the mirror 30, the size of the mirror 30, and the position of the transition between the portions 61 and 62 of the glass are preferably all selected in such a manner that each of these portions deals only with one corresponding function, cornering or fog light. It is nevertheless possible to have a small amount of overlap, enabling the reflector 20 to be closer to the mirror 30, insofar as the stripes 621 adjacent to said transition do not excessively disturb the beam obtained in the coming position.

Figure 8:
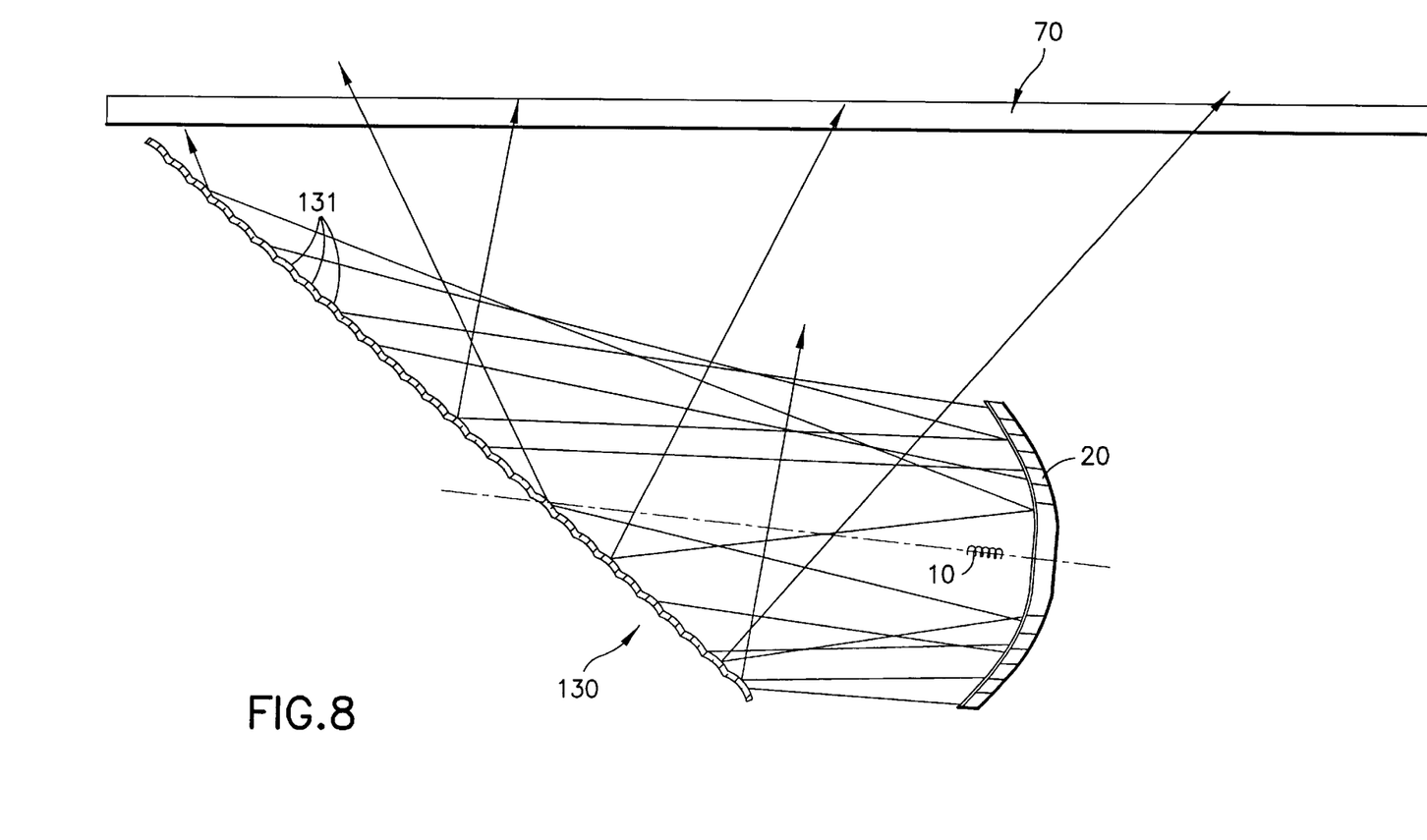
FIG. 8 is a diagrammatic horizontal section view of a fourth embodiment of a two-function headlight of the invention.

FIG. 8 shows another embodiment of the present invention.

In this case, the glass 70 is entirely smooth while the deflector mirror, given references 130, is no longer a plane mirror but is a mirror that possesses a plurality of vertical stripes 131. These stripes perform a role equivalent to that of the stripes 421 on the glass in the embodiment of FIGS. 1 and 2, namely providing horizontal spreading and diluting the concentration spot in the beam as delivered by the reflector 20.

This solution is advantageous in that with a glass that is entirely smooth there is no longer any problem of a transition between two zones that are to treat the light in different manners.

An advantageous characteristic of the invention in its various embodiments described above lies in taking advantage of the pivotal mounting of the reflector 20 and of the means for moving it which are necessary for performing the cornering function to achieve another displacement of said reflector which, in co-operation optionally with a deflector mirror and with the striped portion 42 of the glass, has the effect of selectively generating a different type of beam, specifically a fog light beam.

Naturally, the present invention is not limited in any way to the embodiments described and shown, and the person skilled in the art will be able to make any variations or modifications thereto within the spirit of the invention.

In particular, the invention can be used in association with a cornering headlight having a swiveling reflector to generate beams other than of the fog light type.

In addition, optical elements such as the stripes described above can be combined both on the deflector mirror 30 and on the portion 42 of the glass.

Finally, the invention is particularly advantageous in that it makes it possible selectively to generate two distinct types of beam using a single headlight that is compact. This provides specialized lighting options, in particular in the confined environment under the hood of a vehicle.

What is claimed is:

1. A motor vehicle headlight comprising a light source mounted in a reflector and a glass, the reflector being mounted to pivot about a generally vertical axis, and displacement means being provided to vary the angular position of the reflector, wherein the reflector is capable of occupying a first angular position which can vary within a given range and in which the beam emitted thereby passes through a first glass to generate a first type of beam, and a second angular position which is fixed and different from each first angular position, and in which the beam passes through a second glass, and wherein the headlight also comprises optical means for generating through said second glass a second type of beam, which is fixed and has photometric characteristics different from those of the beam of the first type generated through the first glass, and said angular positions and the positions of the two glasses are selected so that each of the first and second glasses respectively receives solely the beam emitted by the reflector in any first angular position of said given range, and solely the beam emitted by the reflector in the second angular position.

2. A headlight according to claim 1, wherein the first and second glasses extend one from the other.

3. A headlight according to claim 2, wherein the first and second glasses are made as a single piece.

4. A headlight according to claim 1, wherein the first glass extends ahead of the second glass which then constitutes an intermediate screen between the reflector and the first glass.

5. A headlight according to claim 1, wherein the first glass is essentially smooth and its surface is oriented in such a manner as to attenuate reflection losses thereon.

6. A headlight according to claim 1, wherein the first type of beam generated by the sole reflector is a laterally-spread cutoff cornering beam.

7. A headlight according to claim 1, wherein the second type of beam is a beam of the fog light type.

8. A headlight according to claim 1, wherein said displacement means are suitable for varying said first angular position of the reflector over said given range of angles as a function of the position of the vehicle steering wheel.

9. A headlight according to claim 1, wherein the optical means are suitable for spreading horizontally the light beam emitted by the reflector.

10. A headlight according to claim 1, said second angular position is oblique relative to the longitudinal axis of the vehicle and is situated on the opposite side of said longitudinal axis to said first angular position, and in that said second glass directly receives the beam emitted by the reflector in the second angular position.

11. A headlight according to claim 10, wherein the optical means are provided on said second glass.

12. A headlight according to claim 1, wherein the second glass has rectifying means for rectifying the beam from the reflector when in said second angular position and for obtaining a beam that is substantially parallel to the longitudinal axis of the vehicle.

13. A headlight according to claim 1, wherein the optical means are suitable for spreading horizontally the light beam emitted by the reflector, and for rectifying the beam from the reflector when in said second angular position and for obtaining a beam that is substantially parallel to the longitudinal axis of the vehicle.

14. A headlight according to claim 1, wherein said second angular position is essentially transverse relative to the axis of the vehicle and is situated on the opposite side of said axis to at least one first angular position, and wherein said second glass receives that beam emitted by the reflector when in the second angular position via a deflector mirror.

15. A headlight according to claim 14, wherein the optical means are provided on the second glass.

16. A headlight according to claim 14, wherein the optical means are provided on the deflector mirror.

17. An apparatus comprising:
   a light source;
   a first glass;
   a second glass;
   a reflector for generating a cornering beam from the light emitted by the light source, the reflector is mounted to move between a first angular position which can vary over a given range for directing the beam through the first glass and a second angular position for directing the beam through the second glass; and
   optical means for altering the photometric characteristics of the beam directed through the second glass.

18. An apparatus according to claim 17, wherein the second glass is an intermediate screen between the reflector and the first glass.

19. An apparatus according to claim 17, wherein the first glass is smooth and the surface of the first glass is oriented to attenuate reflection losses thereon.

20. An apparatus according to claim 17, wherein the beam generated by the reflector is a laterally-spread cutoff cornering beam.

21. An apparatus according to claim 17, wherein the beam generated by the reflector is a beam of the fog light type.

22. An apparatus according to claim 17, wherein the reflector pivots in relation to the position of a motor vehicle steering wheel.

23. An apparatus according to claim 17, wherein the optical means are suitable for spreading horizontally the beam emitted by the reflector.

24. An apparatus according to claim 17, wherein the second glass further includes rectifying means for rectifying the beam from the reflector when in the second position.

25. An apparatus according to claim 17, wherein the optical means are provided on the second glass.

26. An apparatus according to claim 17, wherein the second glass receives the beam emitted by the reflector when in the second position via a deflector mirror.

27. An apparatus according to claim 17, wherein the optical means are provided on the deflector mirror.

28. A method for generating two distinct types of light beams comprising:
   emitting light from a light source onto a reflector;
   generating a cornering beam whose angular orientation can vary according to the orientation of the steering wheel of the vehicle, from the light emitted from the light source onto the reflector;
   directing the cornering beam through a first glass when the cornering beam is desired;
   pivoting the reflector to direct the cornering beam through a second glass when a second type of beam having different photometric characteristics than the cornering beam is desired; and
   generating a beam from the cornering beam having different photometric characteristics than the cornering beam to pass through the second glass.

29. A method according to claim 28, wherein generation of the beam that is different from the cornering beam generated by the reflector includes increasing the horizontal spread of the beam.

30. A method according to claim 28, wherein generation of the beam that is different from the cornering beam generated by the reflector includes diluting the concentration spot of the beam.

31. A method according to claim 28, wherein generation of the beam that is different from the cornering beam generated by the reflector includes rectifying the beam overall so as to form a fog light beam.

32. A motor vehicle headlight for selectively generating a cornering beam whose angular orientation can vary according to the orientation of the steering wheel of the vehicle and a second beam comprising:
   a light source;
   a first glass having smooth inner and outer faces;
   a second glass having an inside face and outside face, the inside face and the outside face together from a prism, wherein the inside face of the second glass has a plurality of vertical stripes, wherein the first glass and second glass remain fixed, and
   a reflector for generating the cornering beam, the reflector is mounted to pivot about a generally vertical axis between at least one first angular position in which the cornering beam emitted thereby passes through the first glass wherein reflector is capable of occupying the first angular position which can vary within a given range and a second angular position in which the cornering beam passes through the second glass, wherein the prism and the vertical stripes of the second glass alter the cornering beam into the second beam, wherein the second beam has different photometric characteristics than the cornering beam such that said angular positions and the positions of the two glasses are selected so that each of the first and second glasses respectively receives solely the beam emitted by the reflector in any first angular position of said given range, and solely the beam emitted by the reflector in the second angular position.

33. A motor vehicle headlight for selectively generating a cornering beam and a second beam comprising:
   a light source;
   a first glass having smooth inner and outer faces;
   a second glass, said second glass is an intermediate screen having an inside face and an outside face, the inside face and the outside face form together a prism, wherein the inside face of the second glass has a plurality of vertical stripes, wherein the first glass and second glass remain fixed;
   a reflector for generating the cornering beam, the reflector is mounted to pivot about a generally vertical axis between at least one first angular position in which the cornering beam emitted thereby passes through the first glass and a second angular position in which the cornering beam passes through the second glass, a portion of the first glass is positioned in front of the second glass, wherein the prism and the vertical stripes of the second glass alter the cornering beam into the second beam, wherein the second beam has different photometric characteristics than the cornering beam.

34. A motor vehicle headlight for selectively generating a cornering beam and a second beam comprising:
   a light source;
   a first glass having smooth inner and outer faces;

a second glass;

a deflecting mirror;

a reflector for generating the cornering beam, the reflector is mounted to pivot about a generally vertical axis between at least one first angular position in which the cornering beam emitted thereby passes through the first glass and a second angular position in which the cornering beam generated by the reflector deflects off the deflector mirror towards the second glass, wherein a plurality of vertical stripes are provided on the second glass or the deflector mirror for altering the photometric characteristics of the cornering beam.

* * * * *